US008520472B2

(12) United States Patent
Murray et al.

(10) Patent No.: US 8,520,472 B2
(45) Date of Patent: Aug. 27, 2013

(54) COMPACT LASER SENSORS AND MONITORING SYSTEMS INCLUDING SUCH SENSORS

(75) Inventors: Joseph Murray, Raleigh, NC (US); Gregg Johnson, Atlanta, GA (US)

(73) Assignee: 3 Phoenix, Inc., Fairfax, VA (US)

( * ) Notice: Subject to any disclaimer, the term of this patent is extended or adjusted under 35 U.S.C. 154(b) by 961 days.

(21) Appl. No.: 11/917,130

(22) PCT Filed: Jun. 13, 2006

(86) PCT No.: PCT/US2006/023010
§ 371 (c)(1),
(2), (4) Date: Jun. 17, 2010

(87) PCT Pub. No.: WO2006/135888
PCT Pub. Date: Dec. 21, 2006

(65) Prior Publication Data
US 2010/0246329 A1    Sep. 30, 2010

Related U.S. Application Data (60) Provisional application No. 60/689,554, filed on Jun. 13, 2005.

(51) Int. Cl.
*G01H 9/00*    (2006.01)
*G01L 1/24*    (2006.01)

(52) U.S. Cl.
USPC .......................................... 367/149

(58) Field of Classification Search
USPC .......................................... 367/149
See application file for complete search history.

(56) References Cited

U.S. PATENT DOCUMENTS

| 3,892,979 | A | | 7/1975 | Hodgson et al. |
| 5,473,626 | A | * | 12/1995 | Fan et al. ........................ 372/105 |
| 6,693,848 | B1 | | 2/2004 | Ambs et al. |
| 2010/0246329 | A1 | * | 9/2010 | Murray et al. ................ 367/149 |

FOREIGN PATENT DOCUMENTS

WO    WO 2006135888 A2 * 12/2006

OTHER PUBLICATIONS

Holzapfel et al., "Opto-mechatronic response of high-performance force-sensing microlasers", Proceedings of SPIE, vol. 4564, Oct. 29-31, 2001; pp. 290-301.
Newsbreaks, Laser Focus World; www.laserfocusworld.com/articles/print/volume-36/issue-10/world-news/newsbreaks/newsbreaks.html; vol. 36; 5 pgs; (Oct. 1, 2000).
Wheeler, "Laser Sensors Measure Force"; phototronics.com/ArticlePrint.aspx?AID-7774; 2 pgs.; (Dec. 1, 2000).
Hotzapfel, "High-resolution, very broadband force measurements by solid-state laser transducers"; Measurement, vol. 28 pp. 277-291 (2000).

* cited by examiner

*Primary Examiner* — Daniel Pihulic
(74) *Attorney, Agent, or Firm* — Manatt, Phelps & Phillips, LLP (57) ABSTRACT

Improved laser sensors (10) employing doped laser crystals (24) for transducing output proportional to forces impinging upon the sensors. The disclosed sensors are compact, low powered and may be constructed relatively inexpensively from readily available materials. The disclosed sensors eliminate the need for costly, optical power-sapping fiber connections at the laser crystals. According to certain embodiments, the disclosed sensors are configured for local recovery of output signals using conventional digital telemetry. According to other embodiments, the sensors generate output through a dense wavelength division multiplexing (DWDM) laser (28), thereby allowing remote recovery without the need for frequency division multiplexing and issues involved with preloading the sensors to produce beat frequencies in unique bands.

28 Claims, 10 Drawing Sheets

COMPACT LASER SENSORS AND MONITORING SYSTEMS INCLUDING SUCH SENSORS

This application claims the benefit of U.S. provisional application No. 60/689,554, filed Jun. 13, 2005 and entitled "Acoustic Sensor for Towed Array."

BACKGROUND

Doped lasing crystals, such as Neodymium Doped Yttrium Aluminum Garnet (Nd:YAG) crystals lase at their natural response wavelength when energized with light at their pump wavelength. Optically isotropic lasing crystals produce a single polarization of light at the natural response wavelength when pumped, whereas optically anisotropic lasing crystals produce two orthogonally oriented polarizations of light at the natural response wavelength when pumped. The generation of two orthogonally oriented polarizations is known as "birefringence."

The phenomenon of birefringence associated with doped lasing crystals enables the development of photonic sensors for simultaneous detection of various measurands. These measurands include, among others, acoustic field, depth (i.e., the imposition of a static pressure), multi-axis acceleration, particle velocity sensors, orientation sensors. It is known that the application of force to one face of an isotropic crystal creates a small shift in the lattice of the crystal, and thereby results in the temporary creation of an anisotropic crystal which results in a small change in the wavelength of the polarized light associated with the direction of the force. As the force is applied to the crystal, the unforced direction of the lasing crystal also generates light at the natural response frequency of the crystal. Thus, the crystal simultaneously produces two wavelengths of light in orthogonal polarizations that are nearly the same wavelength. The difference in wavelength can be measured as a beat frequency, which is proportional to the force imposed on the crystal.

Figure 1:
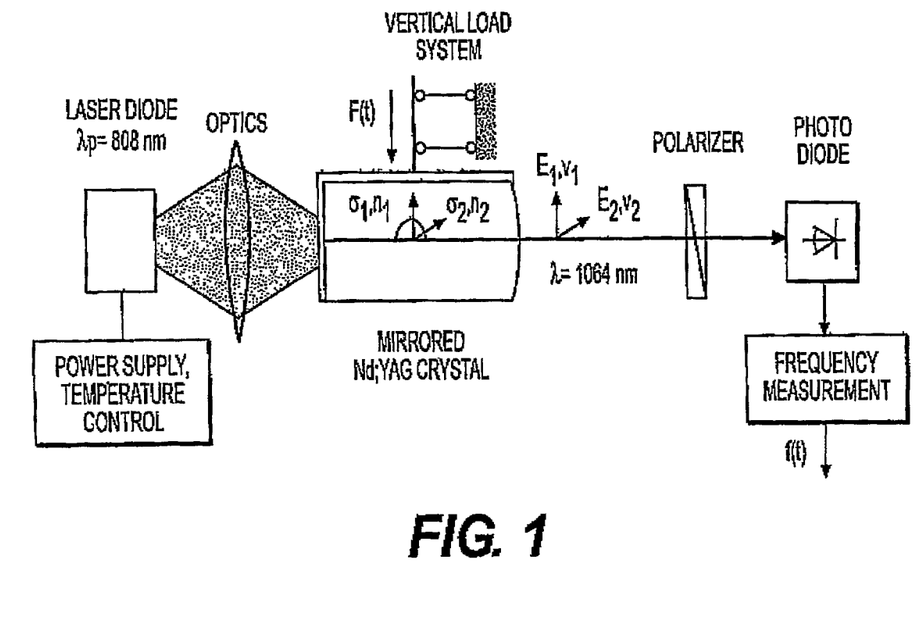
FIG. 1 is a schematic drawing of a conventional microchip laser sensor for measuring forces impinging upon the sensor.

FIG. 1 is a schematic representation of a force transducer apparatus taken from Holzapfel et al. (Holzapfel, W.; Neuschaefer-Rube, St.; Kobusch, M., "High-resolution, very broadband force measurements by solid-state laser transducers", *Measurement*, vol. 28, pp. 277-291, (2000)). In the Holzapfel apparatus, a small diode laser produces a light at the pump wavelength (808 nm in the case of a Nd:YAG lasing crystal). The pump light is focused onto a first coated optical surface of the lasing crystal. A second coated surface of the lasing crystal then generates 1064 nm response light in two orthogonal polarizations. When a force is imposed on a top surface of the crystal, the vertical polarization wavelength of the response light is shifted slightly from its natural frequency. The polarized wavelengths of the response light are then combined with an optical polarizer and the difference frequency, or beat frequency, between the two polarizations are thereafter detected with a photodiode.

Holzapfel et al. used the apparatus of FIG. 1 to measure the beat frequencies for static and dynamic forces placed on Nd:YAG lasing crystals of various sizes with various loading rates. Holzapfel et al. showed that the change in the beat frequency for both statically and dynamically loaded crystals is linear for at least nine decades of force load. Furthermore, the results of the Holzapfel et al. experiments were consistent regardless of the size of the crystal or the method of loading the crystal. The results of the Holzapfel experiment lead to several observations, including: 1) the dynamic range of a sensor employing this concept is strictly limited by the ability to measure a change in the beat frequency of the polarized light; 2) the materials needed to manufacture such sensors are widely available, low-cost components; 3) accurate measurements can be made from DC to the limit of modern phase or frequency detector circuits; and 4) such sensors can be configured to measure force, acceleration, pressure and orientation.

The disclosure of U.S. Pat. No. 6,693,848 to Ambs et al. builds upon the concepts disclosed by Holzapfel. In the '848 patent, Ambs et al. disclose a hydrophone that is an optically-pumped microchip laser that is powered by light at the pump frequency, and produces different beat frequencies related to a pressure field impinging on the microchip laser. Several microchip laser cavities are placed in a single fiber array using fiber splitters. Each crystal is precisely preloaded to produce beat frequencies in a unique band (analogous to wavelength division multiplexing). The pump laser is located near a dry side receiver inside a seismic exploration ship. The frequency of each sensor is measured by placing a linear polarizer oriented at 45 degrees to one of the polarization axes of the sensor's output laser signal. The signal resulting from the polarizer is the beat frequency. Signals from the microchip lasers are reflected onto the single fiber and are converted to electrical energy by photodiodes. The beat frequency of each sensor is measured by a dry side FM receiver. The Ambs et al. approach is advantageous in comparison with conventional, passive optical fiber hydrophones which rely on intensity and/or phase modulation of a reference laser signal. In contrast to signals in passive optical fiber hydrophones, the frequency-modulated signals generated by the Ambs et al. microchip laser sensors are not affected by mechanical perturbations of the fiber telemetry link. Further, intensity fluctuations which can be problematic in interferometer-based passive techniques have no effect on the frequency modulated signals of the Ambs et al. system since the data is not encoded in the intensity.

There remains a need for laser sensors which provide improvements beyond the concepts disclosed by Holzapfel et al. and Ambs et al. In particular, one limiting factor of the seismic array design disclosed by Ambs et al. is the lack of sufficient optical power to create large, many-element arrays. Additionally, the use of fiber coupled to the laser crystals in the Ambs et al. design is costly and requires relatively high optical power for transmitting light through the fiber. Additionally, frequency division techniques are not scalable to larger arrays. It is therefore desirable to provide compact, low power laser sensors that eliminate the need for coupling fiber to the laser crystals. It is also desirable to provide laser sensors that eliminate the need for frequency division multiplexing and issues involved with preloading the sensors to produce beat frequencies in unique bands. It is further desirable to provide improved monitoring systems employing such laser sensors.

SUMMARY

The disclosure concerns improved laser sensors employing doped lasing crystals for generating output proportional to forces impinging upon the laser crystals. The disclosed sensors are compact, low powered and may be constructed relatively inexpensively from readily available materials. The disclosed sensors eliminate the need for long, costly, optical power-sapping fiber optic cables between the lasing crystal and a pumping device for the lasing crystal and between the lasing crystal and an output detecting device for the lasing crystal. According to certain embodiments, the disclosed sensors are configured for local recovery of output signals using conventional digital telemetry. According to other embodiments, the disclosed sensors generate output signals through a dense wavelength division multiplexing (DWDM) laser, thereby eliminating the need for frequency division multiplexing and issues involved with preloading the sensors to produce beat frequencies in unique bands.

The disclosure further concerns seismic and sonar monitoring systems employing arrays of improved laser sensors. The sensor arrays are low powered and require a single fiber optic line connecting multiple sensors. Furthermore, the design of the sensor arrays is relatively simple, as there is no outboard logic in the sensor arrays and only passive electronics are employed.

According to one embodiment, a laser sensor comprises:
- a doped lasing crystal arranged to generate a light at two different frequencies with two orthogonal polarizations, said light exhibiting a beat frequency between said two different frequencies which varies in accordance with a force incident upon the lasing crystal;
- a pump diode generating an excitation light to drive said lasing crystal, said pump diode adjacent to and directly coupled to a first end of said lasing crystal by a direct butt-coupling integrated optic; and
- a photodetector directly coupled to a second end of said lasing crystal by a direct butt-coupling integrated optic.

According to another embodiment, a monitoring system comprises:
- a fiber optic transmission line;
- a sensor array comprising at least two laser sensors, wherein each of said at least two laser sensors comprises:
  - a doped lasing crystal arranged to generate a light at two different frequencies with two orthogonal polarizations, said light exhibiting a beat frequency between said two different frequencies which varies in accordance with a force incident upon the lasing crystal;
  - a pump diode generating an excitation light to drive said lasing crystal, said pump diode adjacent to and directly coupled to a first end of said lasing crystal by a direct butt-coupling integrated optic;
  - a photodetector directly coupled to a second end of said lasing crystal by a direct butt-coupling integrated optic;
  - a dense wavelength division multiplexing laser in communication with said photodetector, said dense wavelength division multiplexing laser generating an output modulated by said output current and exhibiting frequency shifts proportional to said force; and
  - a fiber optic cable connected to said dense wavelength division multiplexing laser for transmitting said output, wherein said fiber optic cable is in communication with said fiber optic transmission line; and
- a receiving unit arranged to process said output, said receiving unit comprising:
  - an optical demultiplexer connected to said fiber optic transmission line to demultiplex output light from said at least two laser sensors and to produce demultiplexed outputs; and
  - optical receivers in communication with said optical demultiplexer and arranged to process said demultiplexed outputs from said optical demultiplexer, wherein each of said optical receivers includes a photodiode for converting light into an electrical signal and an analog-to-digital converter for converting an output of said photodiode to digital data.

Other features and advantages will become apparent from the description and drawings that follow.

DETAILED DESCRIPTION

Figure 2:
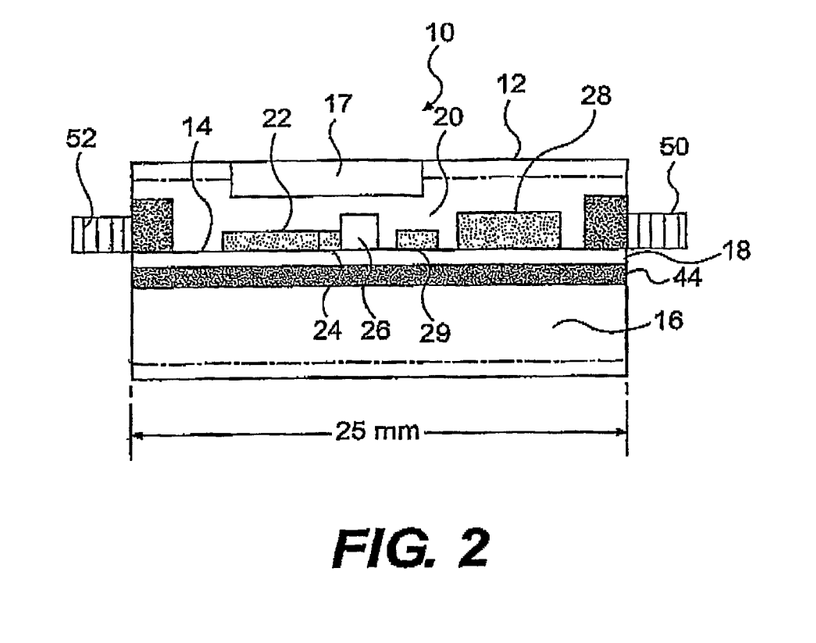
FIG. 2 is a side sectional view of a novel laser sensor according to one embodiment.

FIGS. 2-5 show a laser sensor 10 according to one embodiment. The laser sensor 10 may be used, for example as an acoustic sensor in a towed sensor array of an aquatic seismic or sonar monitoring system. Referring to FIGS. 1 and 2, the sensor 10 includes a housing 12 encasing an internal sensing unit 14. The sensing unit 14 is supported in the housing 12 by polymer potting 16. As shown in FIGS. 1 and 2, the housing 12 may be cylindrical. However, other shapes are possible for the housing.

Figure 4:
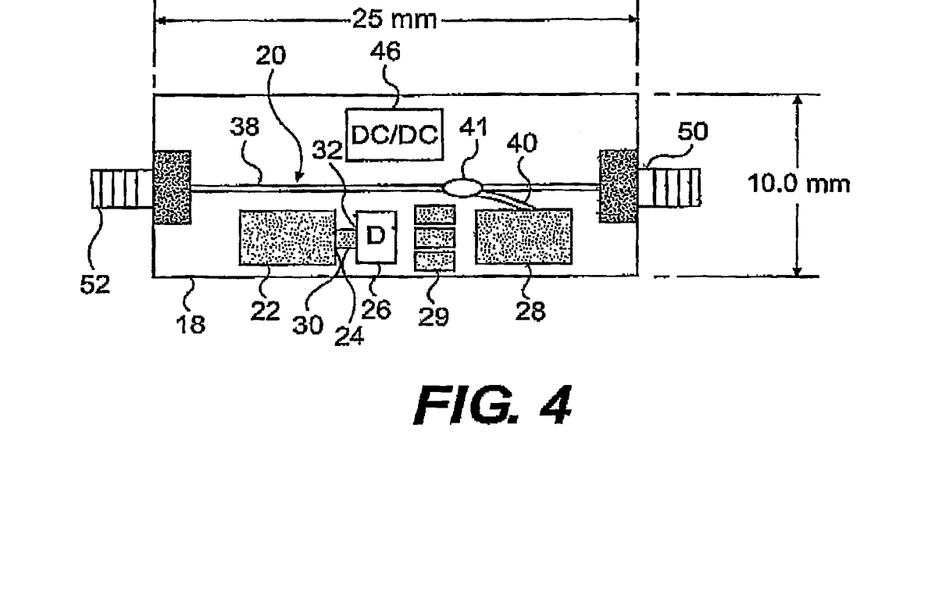
FIG. 4 is a partial top plan view of the sensor of FIG. 2.
Figure 5:
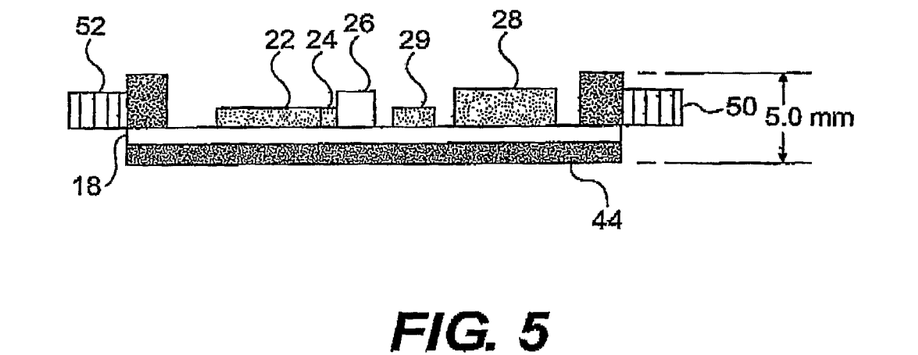
FIG. 5 is a partial side view of the sensor of FIG. 2.

Referring to FIGS. 2, 4 and 5, the internal sensing structure 14 includes an active sensing unit 17, a baseboard 18 and an electrical and photonic circuit 20 supported by the baseboard 18. The circuit 20 includes a low-power pump diode 22, an anisotropic (birefringent) crystal laser 24, a compact, low-power photodetector (e.g., photodiode) 26 and a dense wavelength division (DWDM) laser 28. A low-pass filter 29 may also be provided.

Figure 3:
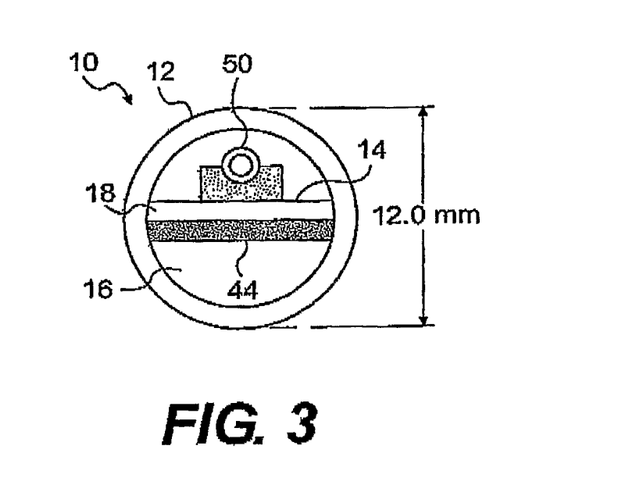
FIG. 3 is an end view of the sensor of FIG. 2.

As shown in FIGS. 2, 3 and 5, a capacitor 44 is provided for storing electrical power to be supplied to the circuit 20. As will be described in a further embodiment directed to a seismic and sonar monitoring system, the capacitor 44 enables powering of the sensor 10. The capacitor 44 may be attached on a side of the baseboard 18 opposite the side on which the other elements of the circuit 20 are attached. Such an arrangement allows the capacitor 44 to be relatively large to ensure adequate power storage. A DC power regulator and trickle charger unit 46 is also provided for controlling charging of the capacitor as well as the supply of electrical power to the circuit 30.

The lasing crystal 24 is constructed to emit an output light signal at a natural response wavelength. The lasing crystal 24 may have a cross-sectional area of 1 mm$^2$ or less and may be, for example, an Nd:YAG lasing crystal having a pump wavelength of 808 nm and a response wavelength of 1064 nm. Other possible lasing materials for the crystal 24 include, but are not limited to, Nd:YV04, Nd:YLF, Ti:Sapphire, Yb:YAG, Er:YAG ND:Ce:YAG and Ho:Cr:Tm:YAG. The pump diode 22 is located adjacent to and directly coupled to a first side of the lasing crystal 24 by a first direct butt-coupling integrated optic 30. The size and materials of the crystal 24 can be tailored to meet the specific needs of an application. The photodetector 26 is located adjacent to and directly coupled to a second side of the lasing crystal 24 opposite the first side by a second direct butt-coupling integrated optic 32. The direct butt-coupling integrated optics 30 and 32 may include glass feral mounts and alignment optics bonded to the crystal by a UV epoxy. When a Nd:YAG lasing crystal is used, the pump diode 22 generates pump light at a wavelength of 808 nm and the photodetector 26 converts 1064 nm wavelength light to electrical energy.

The DWDM laser 28 is connected in the circuit 20 such that it is driven by output current of the photodetector 26. As shown in FIG. 4, the DWDM laser 28 is connected to a fiber optic cable 38 in the sensor by a fiber branch 40 at junction 41.

The sensor 10 further includes an input fiber connector 50 connected to an input end 38a of the fiber optic cable 38 and an output fiber connector 52 connected to an output end 38b of the fiber optic cable 38. The connectors 50, 52 may be surface mounted on the baseboard 18 and extend outside the housing 12 for connection to upstream and downstream segments of an external fiber optic transmission line.

In operation of the sensor, the pump diode 22 focuses an optical beam on the laser crystal 24, causing the laser crystal 24 to lase a response light signal at the response wavelength of the crystal 24. The response light signal has two orthogonal wavelengths of slightly different frequency. The difference in the frequencies of the two polarizations is the beat frequency of the response light signal.

The photodetector 26 receives the response light signal and converts the energy from the response light signal into electrical energy in the form of an output current which is proportional to the beat frequency of the response light signal. The DWDM laser 28 generates an output light signal based on the output current of the photodetector 26. In particular, the output current of the photodetector 26 is used as a modulation signal which is applied to the DC bias current on the DWDM laser 28. Thus, the frequency of the output light signal from the DWDM laser 28 is proportional to the output current of the photodetector 26. Since the photodetector 26 is capable of generating frequencies above the frequency range in which useful information is carried, the low-pass filter 29 cuts off frequencies from the photodetector above a specified threshold.

The output light signal from the DWDM laser 28 is transmitted to the fiber optic cable 38, from which the output light signal can be transmitted into an external fiber optic transmission line (i.e., fiber telemetry link) of a seismic and sonar monitoring system. As will be described in greater detail in further embodiments, output light signals from one or more additional sensors in a sensor array may be passed through the fiber optic cable 38 of the sensor 10 via the input connector 50 and the output connector 52.

The low-pass filter 29 is a passive circuit used to limit the transmission bandwidth to the maximum bandwidth of the DWDM laser.

The active sensing element 17 couples the measurand to the lasing crystal 24 with gain that is related to its mass, impedance, and surface area. When a dynamic force is applied to the sensor 10 (e.g, acoustic pressure), the force is acts on the crystal 24 via the active sensing element 17, and causes a shift in the beat frequency of the crystal's response light signal. The beat frequency of the response light signal is proportional to the force applied to the crystal 24. The shift in beat frequency in proportion to applied force has been shown to be linear for over nine decades for Nd:YAG laser crystals. Since the output current of the photodetector 26 is proportional to the beat frequency of the response light signal, and the output light signal of the DWDM laser 28 is proportional to the output current of the photodetector 26, one can determine the magnitude of dynamic forces acting on the sensor 10 based on changes in the frequency of the output light signal of the DWDM laser 28.

A static force applied to the sensor 10 causes a DC shift in the beat frequency of the response light signal. Thus, because static pressure is directly proportional to depth, the depth of the sensor 10 can also be determined based on DC frequency changes in the output light signal due to DC shifts in the beat frequency. In other versions of the sensor 10, one can determine the orientation of the sensor 10 with respect to the gravitational field by coupling a mass (not shown) to the crystal 24, decoupling the mass from the pressure sensing function and reading the change in the output frequency of the DWDM laser 28. Thus, acoustic pressure, sensor depth and the orientation of the sensor 10 relative to the gravitational field of the Earth can be measured simultaneously.

Figure 14:
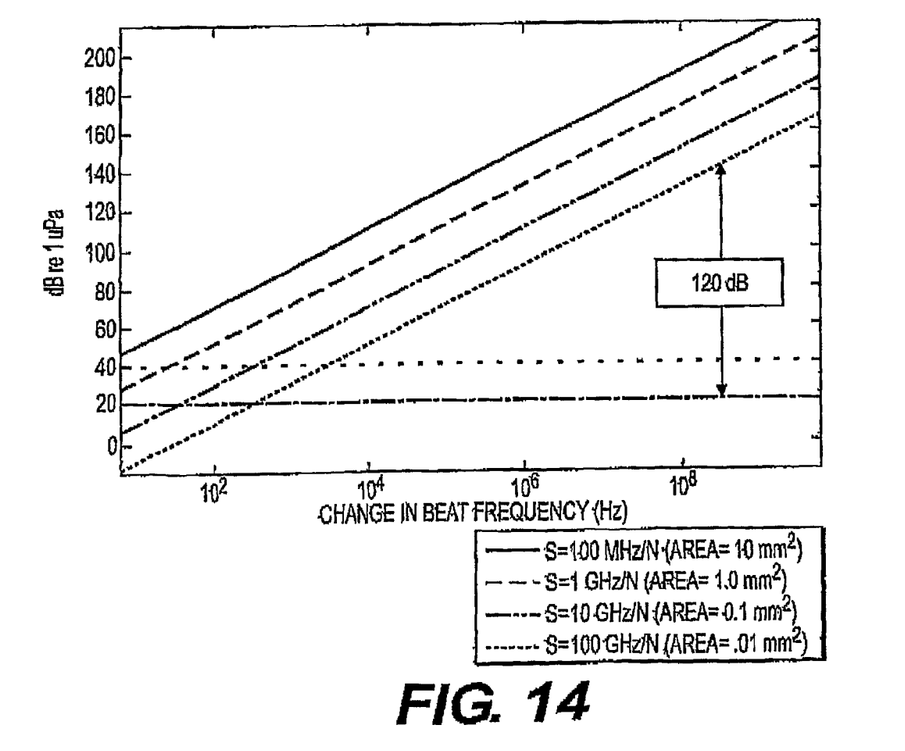
FIG. 14 is a graph showing applied pressure plotted against change in beat frequency for the disclosed laser sensors.

The sensitivity of the sensor 10 increases inversely in proportion to the cross-sectional area of the lasing crystal 24. For a common crystal size of 0.1 mm$^2$ and using a typical design for a coupling to the measurand using an impedance-matched surface with a pin or lever coupled to the crystal transducer surface, a sensitivity of 10 GHz of change in beat frequency per Newton can be achieved. According to a conservative expectation for the sensor 10, a pressure field of 8,000 Pa would translate to 1 N of force applied to the crystal. This is the equivalent of transferring the force applied to a flexible disc of 1 cm radius to the crystal 24. As shown in experiments by Holzapfel et al., the stability of the beat frequency is 3 Hz over a 60-second sample period. With a sensitivity of 10 GHz of change in beat frequency per Newton, 3 Hz equates to about 0.2 μPa or −12 dB re 1 μPa. FIG. 14 shows pressure versus change in beat frequency for a crystal 24.

Figure 15:
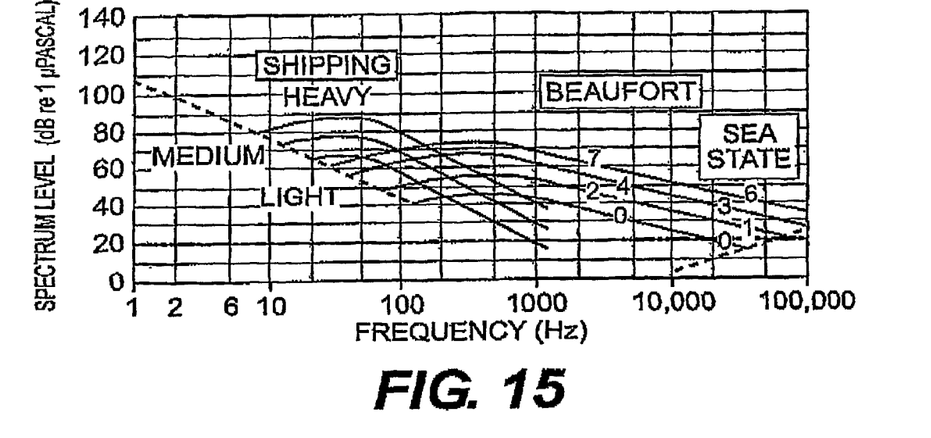
FIG. 15 is a graph showing the spectrum level associated with various sea-states.

For comparison, FIG. 15 illustrates the spectrum level associated with various sea-states (taken from "Principles of Underwater Sound, 3$^{rd}$ Edition, Urick, 1983, pg. 210). FIG. 15 shows that, at the frequency range of interest (DC to less than 25 kHz), even sea state 0 is typically above 30 dB re 1 μPa, although 20 dB is often used as a good sensor noise floor. Referring back to FIG. 14, the target 20 dB noise floor is indicated by the horizontal line, and a minimum of 120 dB dynamic range is indicated by the vertical arrow line. The dynamic range and noise floor of the sensor 10 is dictated by the ability to resolve the change in beat frequency. Therefore, the dynamic range of the sensor 10 is really only limited by the bandwidth of the photodetector 26 and the sampling rate of the frequency detection device being used to read the sensor output.

The sensor 10 provides significant advantages over conventional, passive optical-fiber hydrophones, which rely upon intensity and/or phase modulation of a reference laser signal, and conventional PZT sensors which have relatively low sensitivity. In contrast to the output signals of passive optical-fiber hydrophones, the frequency-modulated output signals from the DWDM laser 28 in the sensor 10 are unaffected by perturbations of the fiber telemetry link to which the sensor 10 is connected. Intensity fluctuations which can plague interferometer-based passive techniques have no effect on the frequency modulated signals of the DWDM laser 28, since the data is not encoded in the intensity of the signal. Because the frequency modulation of the output signal is encoded at the sensor 10 and cannot be shifted or otherwise compromised by the telemetry system in which the sensor 10 is employed, the sensor 10 provides a robust noise rejection scheme that is somewhat analogous to common mode rejection in electrical circuits.

Figure 12:
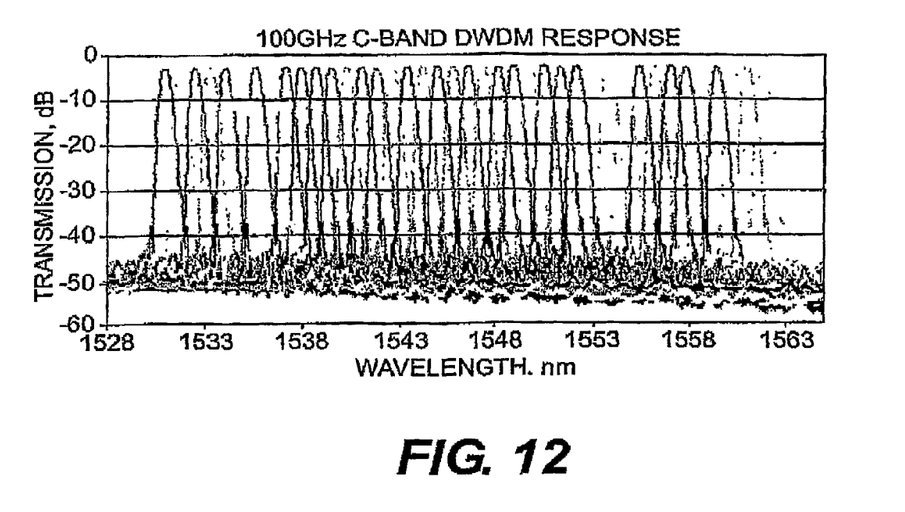
FIG. 12 is a graph providing an example of the response from a dense wavelength division multiplexing laser used in the sensors of FIGS. 2-7.
Figure 13:
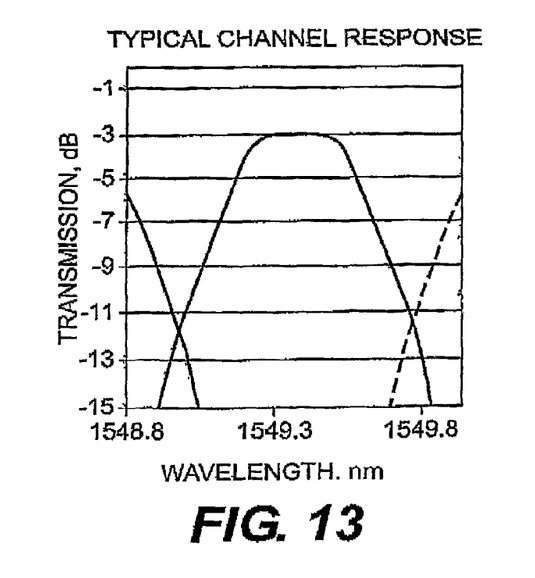
FIG. 13 is a graph showing an example of a typical channel response of a dense wavelength division multiplexing laser.

Additionally, measurement or sampling of the carrier frequency from the crystal laser 24 is not required, resulting in lower cost and simpler design of transmission and receiving systems incorporating the sensor 10. When multiple sensors 10 are used in a sensor array, the use of the DWDM laser 28 eliminates the need for frequency division multiplexing and issues associated with pre-loading each sensor to offset the frequency response range of each sensor 10, because each sensor 10 generates an output light signal in its own discrete wavelength. Where a 1550 nm International Telecommunications Union (ITU) grid telemetry laser is used for the DWDM laser 28, 25 GHz channel spacing with 166 channels on the grid is widely available for use in a sensor array. FIGS. 12 and 13 show the C-Band response and typical channel response, respectively, of a commercially available ITU grid laser having 100 GHz channel spacing (ITU G.692).

The sensor 10 is also advantageous in that it is small in size, requires no digital logic in the sensor itself and can be constructed relatively inexpensively from widely available components. The sensor 10 may be as small as 12 mm in diameter and 25 mm in length. The baseboard 18 may be as small as 10 mm wide by 25 mm long, including the fiber connectors 50 and 52.

Figure 6:
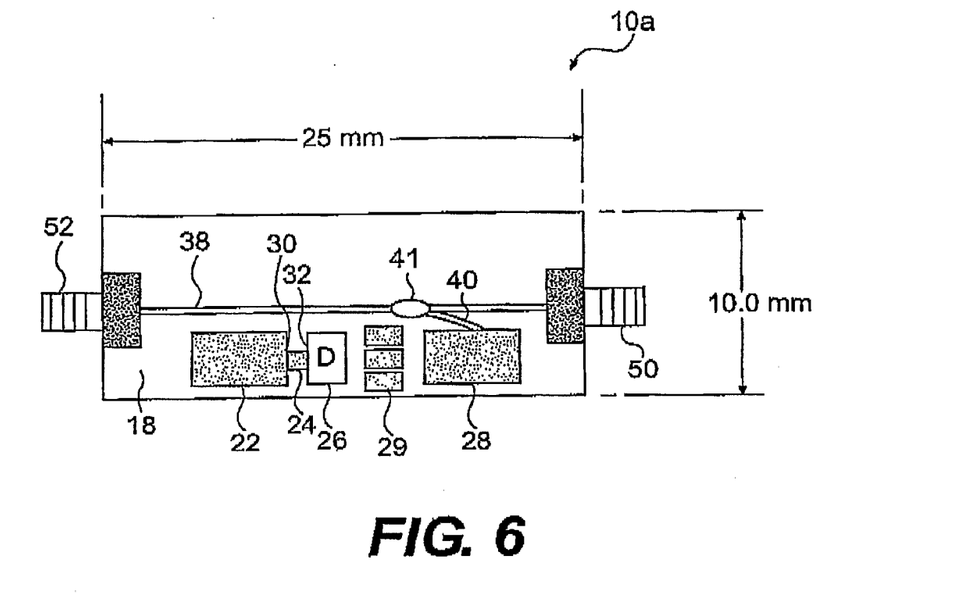
FIG. 6 is a partial top plan view of a novel laser sensor according to another embodiment.
Figure 7:
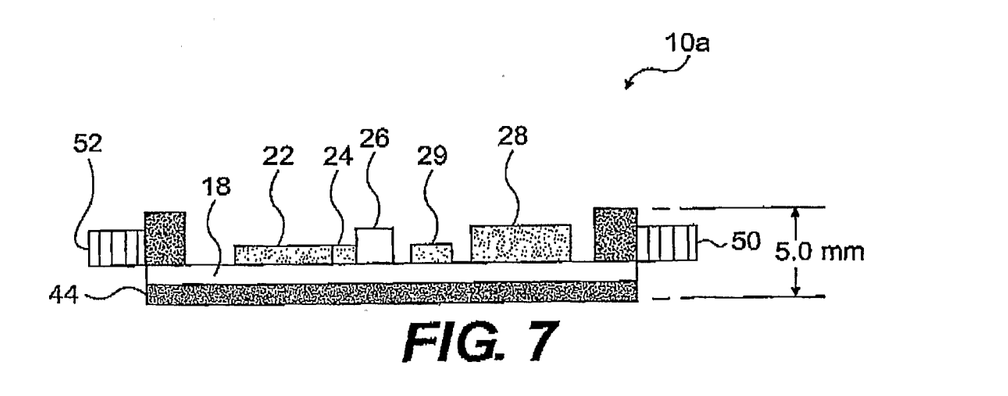
FIG. 7 is a side sectional view of the laser sensor of FIG. 7.

FIGS. 6 and 7 show a laser sensor 10a according to another embodiment, wherein reference numbers repeated from FIGS. 2-5 indicate similar components. Laser sensor 10a is similar to laser sensor 10, except that sensor 10a lacks the capacitor 44 and DC power regulator and trickle charger unit 46 included in the sensor 10. Thus, the sensor 10a must be powered by an external power supply.

Figure 16:
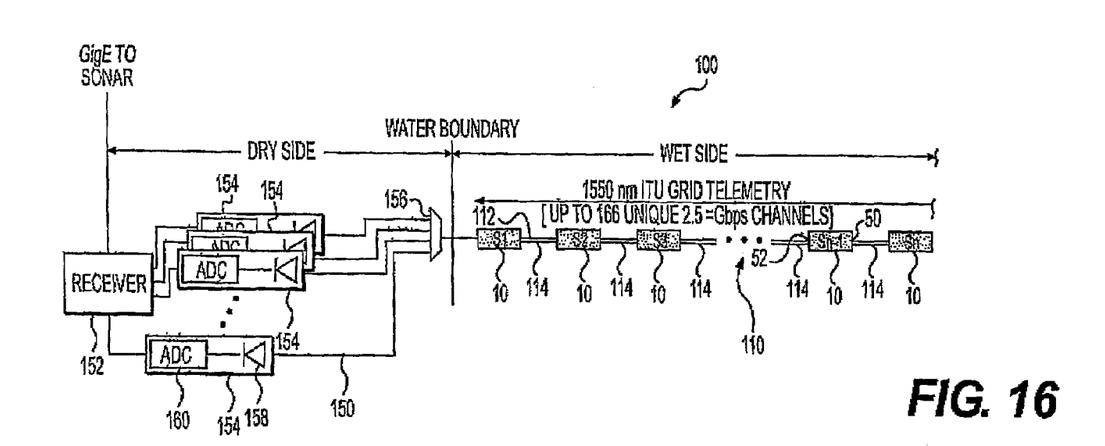
FIG. 16 is a schematic drawing of a monitoring system according to another embodiment, wherein an array of laser sensors is parasitically powered.

FIG. 16 shows a seismic and sonar monitoring system or telemetry system 100 including a towed sensor array 110 a receiving unit 150. The sensor array 110 is located on the wet side of the system 100 (i.e., in a body of water). The receiving unit 150 is located on the dry side of the system 100 (i.e., aboard a ship).

The sensor array 110 includes a plurality ($S_1$-$S_n$) of laser sensors 10 connected in series along a fiber optic transmission line or telemetry backbone 112. The fiber optic transmission line 112 may be a single-mode optical fiber and is only required to carry output signals from the sensors 10 to the receiving unit 150. The input connector 50 of each sensor 10 (except for the last sensor in the line 112) is connected to a downstream portion of the transmission line 112 by the input connector 50, while the output connector 52 of each sensor 10 is connected to an upstream portion of the transmission line 112. Thus, the output light signal of each sensor 10 is carried by the transmission line and is passed through any upstream sensors (via the fiber optic cable 38 in each sensor) to the receiver unit 150. Where 1550 nm ITU grid telemetry lasers are used for the DWDM lasers 28, many unique 2.5 Gbps channels are available, meaning that the number of sensors 10 that can be used per transmission line 112 is limited only by the number of ITU grid channels.

Figure 17:
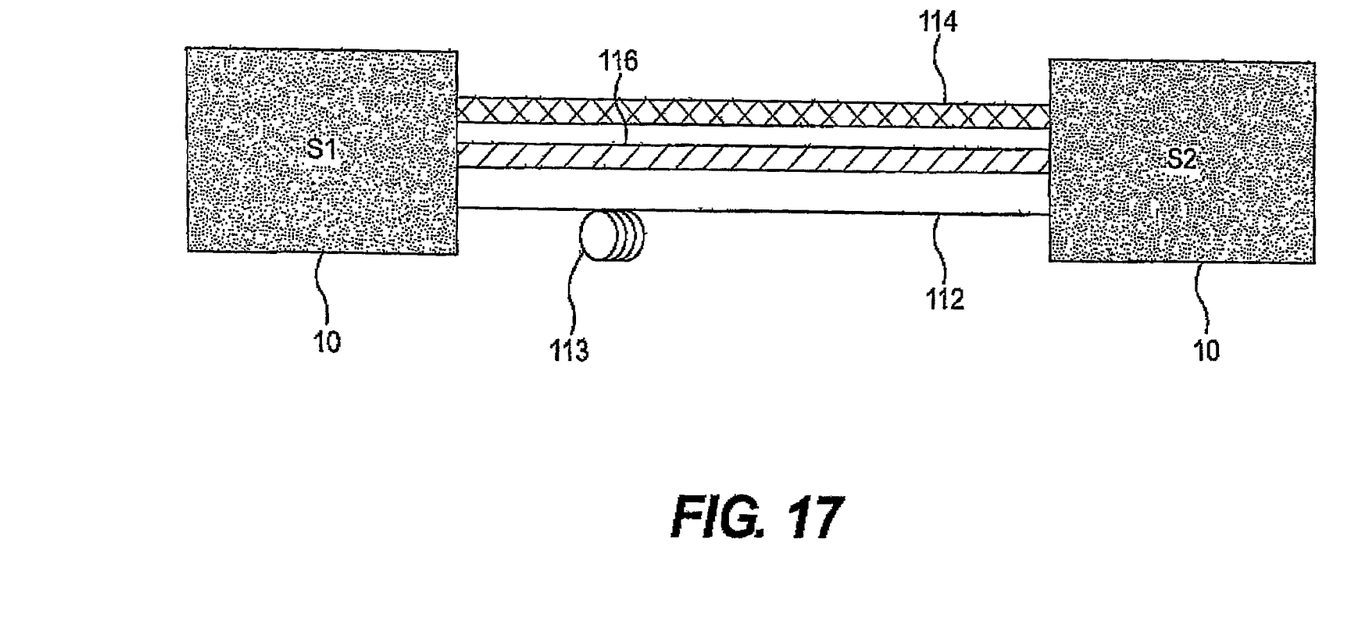
FIG. 17 illustrates the connection of two laser sensors in the system of FIG. 16.

Referring to FIGS. 16 and 17, piezoelectric (PZT) fibers 114 extend between adjacent sensors 10 and are operatively connected to the capacitor 44 of each sensor. Vibration and tension in the fibers 114 parasitically powers the sensors 10, thereby eliminating the need for a dry-side power supply. As shown in FIG. 17, slack 113 is provided in the fiber optic transmission line 112 in order to prevent stress in the fiber connection between sensors 10. Additionally, strength members 116 that are slightly longer than the PZT fibers 114 are placed between adjacent sensors 10 in order to limit tension in the PZT fibers.

The receiver unit 150 includes a main receiver 152, a plurality of optical receivers 154 in communication with the main receiver 152, and an optical demultiplexer 156 connected to the optical receivers 154 and the fiber optic transmission line 112. The optical demultiplexer demultiplexes the light output signals from each sensor 10 and transmits demultiplexed light signals to the optical receivers 154. An optical receiver 154 is provided for each sensor 10 in the array 110. Each optical receiver 154 includes photodiodes 158 for converting the demultiplexed light signals to electrical signals and further includes analog-to-digital converters (ADCs) or frequency modulation (FM) receiver devices 160 for converting the electrical signals from the photodiodes 158. Other frequency detection means, including frequency-to-voltage circuits such as the commercially available Phase Locked Loops (PLLs), may be used instead of the ADCs and FM receivers 160. The main receiver 152 decodes the output of the optical receivers 154 and communicates the decoded information to sonar equipment.

Figure 18:
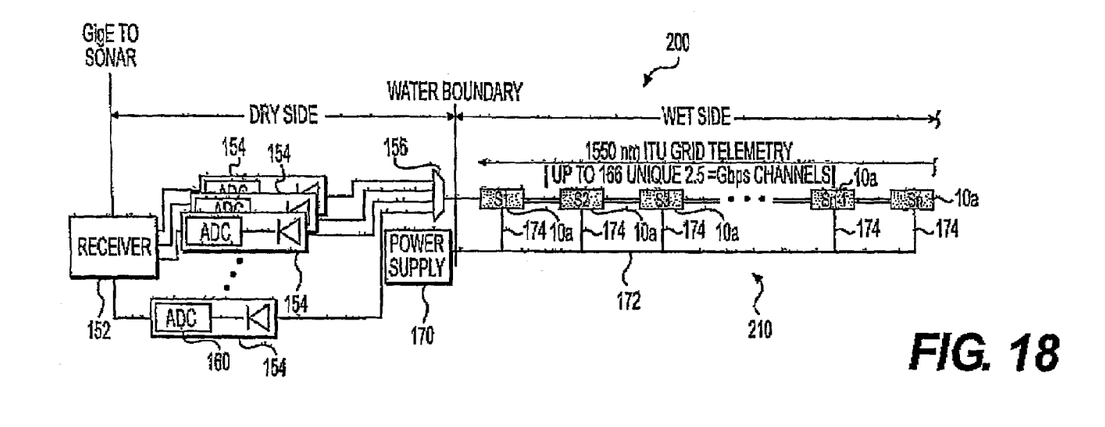
FIG. 18 is a schematic drawing of a monitoring system having a remote power source supplying power to an array of laser sensors.

FIG. 18 illustrates another seismic or sonar monitoring system 200, which is similar to system 100, except that system 200 includes a towed sensor array 210 with sensors 10a and does not employ parasitic powering of the array 210. Instead of PZT fibers 114 and the associated tension limiting strands 116, a power supply 170 is provided on the dry side of the system 200. The power supply 170 is connected to each sensor by an electrical power line 172 and branch lines 174, thereby supplying the necessary power to each sensor 10a.

The arrays 110 and 210 require three orders less power than conventional towed arrays, due in part to the location of individual, low-power pump diodes 22 in each sensor 10, and due to the elimination of fiber connections between the pump diodes 22 and the respective lasing crystals 24 and between the photodetectors 26 and the respective lasing crystals 24. The pump diode 22 and photodetector 26 require only about 5 µW each. The DWDM laser 28 also contributes to low power consumption, as a 166-channel ITU grid laser requires only about 10 µW of power. Due to the high bandwidth of DWDM lasers 28 and the low power consumption of the sensors 10, the disclosed towed sensor arrays can be scaled up to extremely large sizes that are not possible with conventional towed sensor arrays. Furthermore, the disclosed arrays require much fewer optical fiber connections and electrical connections than conventional arrays, resulting to less expense and simpler design. Additionally, completely redundant arrays can be achieved by using two fiber optic transmission lines 112. In the redundant configuration, two uplink fibers 112 will be used and a single ITU grid laser will be capable of driving two fibers in parallel.

Figure 8:
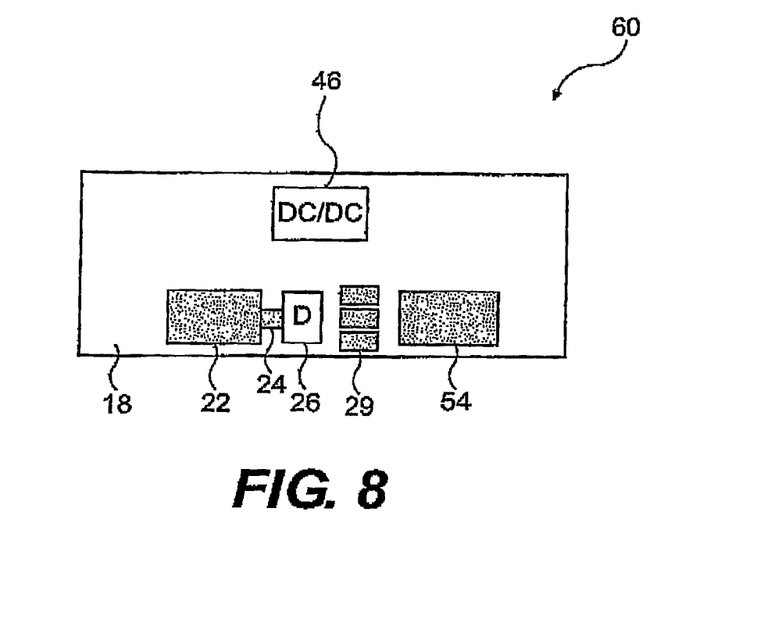
FIG. 8 is a partial top plan view of a novel laser sensor according to yet another embodiment.
Figure 9:
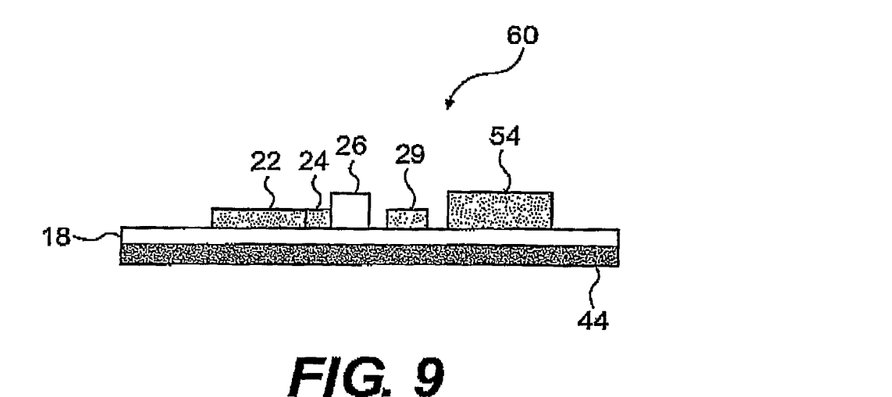
FIG. 9 is a side sectional view of the laser sensor of FIG. 8.

FIGS. 8 and 9 show laser sensor 60 according to an additional embodiment. The laser sensor 60 shares components with the sensor 10 of FIGS. 2-5, except that the sensor 60 is modified for local recovery of the sensor's output signal. The sensor 60 includes a FM receiver 54 which decodes the output signal of the photodetector 26. Information may be recovered locally from the FM receiver 54 by know digital telemetry techniques in order to determine sensor depth, sensor orientation and acoustic pressure acting on the sensor 60. As there is no optical output signal in the sensor, there is no need for an optical fiber or optical inputs/outputs. The sensor 60 may be powered parasitically in the same manner as the sensors 10 in the embodiment of FIGS. 16 and 17.

Figure 10:
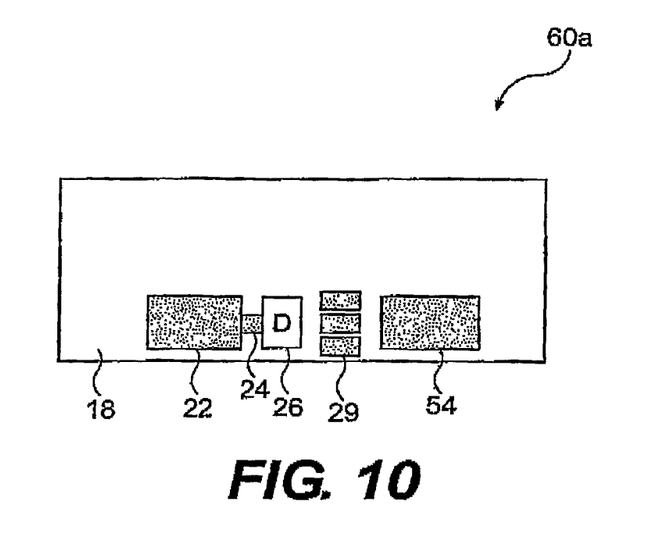
FIG. 10 is a partial top plan view of a novel laser sensor according to still another embodiment.
Figure 11:
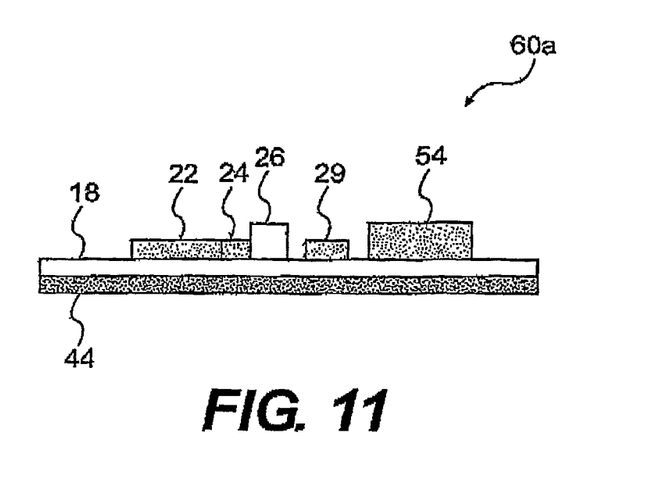
FIG. 11 is a side sectional view of the laser sensor of FIG. 10.

FIGS. 10 and 11 show yet another embodiment of a laser sensor 60a. Sensor 60a is similar to sensor 60, except that is lacks the capacitor 44 and DC power regulator and trickle charger unit 46 included in the sensor 60. Thus, the sensor 60a must be powered by an external power supply.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments, not explicitly defined in the detailed description.

We claim:

1. A laser sensor comprising:
   a doped lasing crystal arranged to generate a light at two different frequencies with two orthogonal polarizations, said light exhibiting a beat frequency between said two different frequencies which varies in accordance with a force incident upon the lasing crystal;
   a pump diode generating an excitation light to drive said lasing crystal, said pump diode adjacent to and directly coupled to a first end of said lasing crystal; and
   a photodetector directly coupled to a second end of said lasing crystal.

2. The laser sensor of claim 1, further comprising an FM receiver capable of reading output current from said photodiode.

3. The laser sensor of claim 2, further comprising a baseboard including a circuit, wherein said lasing crystal, said pump diode, said photodetector and said FM receiver are attached to said baseboard and form part of said circuit.

4. The laser sensor of claim 3, wherein said circuit comprises a capacitor attached to said baseboard and arranged to store power to be supplied to said circuit.

5. The laser sensor of claim 4, wherein said circuit further comprises a DC power regulator and trickle charger unit arranged to charge said capacitor and regulate said power.

6. The laser sensor of claim 1, comprising:
   a dense wavelength division multiplexing laser in communication with said photodetector, said dense wavelength division multiplexing laser generating an output modulated by output current from said photodetector and exhibiting frequency shifts proportional to said force; and
   a fiber optic cable connected to said dense wavelength division multiplexing laser for transmitting said output.

7. The laser sensor of claim 6, comprising at least one fiber connector connected to said fiber optic cable, said at least one fiber connector being arranged for connection to a fiber optic transmission line.

8. The laser sensor of claim 6, comprising a baseboard including a circuit, wherein said lasing crystal, said pump diode, said photodetector and said dense wavelength division multiplexing laser are attached to said baseboard and form part of said circuit.

9. The laser sensor of claim 8, wherein said circuit comprises a capacitor attached to said baseboard and arranged to store power to be supplied to said circuit.

10. The laser sensor of claim 9, wherein said integrated circuit comprises a DC power regulator and trickle charger arranged to charge said capacitor and regulate said power.

11. The laser sensor of claim 7, wherein said at least one fiber optic connector comprises:
    an input connector connected to an input end of said fiber optic cable; and
    an output connector connected to an output end of said fiber optic cable.

12. The laser sensor of claim 6, wherein said dense wavelength division multiplexing laser is a 1550 nm ITU grid telemetry laser.

13. A seismic or sonar monitoring system comprising:
    a fiber optic transmission line;
    a seismic or sonar sensor array comprising at least two laser sensors,
    wherein each of said at least two laser sensors comprises:
    a doped lasing crystal arranged to generate a light at two different frequencies with two orthogonal polarizations, said light exhibiting a beat frequency between said two different frequencies which varies in accordance with a force incident upon the lasing crystal;
    a pump diode generating an excitation light to drive said lasing crystal, said pump diode adjacent to and directly coupled to a first end of said lasing crystal;
    a photodetector directly coupled to a second end of said lasing crystal;
    a dense wavelength division multiplexing laser in communication with said photodetector, said dense wavelength division multiplexing laser generating an output modulated by output current from said photodetector and exhibiting frequency shifts proportional to said force; and
    a fiber optic cable connected to said dense wavelength division multiplexing laser for transmitting said output, wherein said fiber optic cable is in communication with said fiber optic transmission line;
    a receiving unit arranged to process said output, said receiving unit comprising:
    an optical demultiplexer connected to said fiber optic transmission line to demultiplex output light from said at least two laser sensors and to produce demultiplexed outputs; and
    optical receivers in communication with said optical demultiplexer and arranged to process said demultiplexed outputs from said optical demultiplexer,
    wherein each of said optical receivers includes a photodiode for converting light into an electrical signal and an analog-to-digital converter for converting an output of said photodiode to digital data.

14. The seismic monitoring system of claim 13, wherein each of said at least two laser sensors comprises a baseboard including a circuit, wherein said lasing crystal, said pump diode, said photodetector and said dense wavelength division multiplexing laser are attached to said baseboard and form part of said circuit.

15. The seismic monitoring system of claim 14, comprising a PZT fiber extending between adjacent laser sensors among said at least two laser sensors, wherein said PZT fiber is arranged to generate power from vibration and or tension of the PZT fiber, and wherein said integrated circuit comprises a capacitor attached to said baseboard and arranged to store said power for powering said circuit.

16. The seismic or sonar monitoring system of claim 15, comprising a strength member tension limiter extending between said adjacent laser sensors.

17. The seismic or sonar monitoring system of claim 15, wherein said circuit comprises a DC power regulator and trickle charger arranged to charge said capacitor and regulate said power.

18. The seismic or sonar monitoring system of claim 13, wherein each of said at least two laser sensors comprises at least one fiber connector connecting said fiber optic cable to said fiber optic transmission line.

19. The seismic or sonar monitoring system of claim 13, wherein one or more of said at least two laser sensors comprises:
  an input fiber connector connected to an input end of said fiber optic cable and a downstream portion of said fiber optic transmission line; and
  an output fiber connector connected to an output end of said fiber optic cable and an upstream portion of said fiber optic transmission line.

20. The seismic or sonar monitoring system of claim 13, wherein said dense wavelength division multiplexing laser is a 1550 nm ITU grid telemetry laser.

21. The seismic or sonar monitoring system of claim 13, comprising a power supply for powering said at least two laser sensors, wherein said power is located remotely from said at least two laser sensors.

22. The seismic or sonar monitoring system of claim 13, wherein said receiving unit is located at a dry side of said monitoring system and wherein said sensor array is located at a wet side of said monitoring system.

23. The laser sensor of claim 1 wherein said directly coupled pump diode is coupled to said lasing crystal by a direct butt coupling integrated-optic.

24. The laser sensor of claim 1 wherein said directly coupled photodetector is coupled to said lasing crystal by a direct butt coupling integrated-optic.

25. The laser sensor of claim 1 wherein said directly coupled pump diode is coupled to said lasing crystal by a direct butt coupling integrated-optic and said directly coupled photodetector is coupled to said lasing crystal by a direct butt coupling integrated-optic.

26. The monitoring system of claim 13 wherein said directly coupled pump diode is coupled to said lasing crystal by a direct butt coupling integrated-optic.

27. The monitoring system of claim 13 wherein said directly coupled photodetector is coupled to said lasing crystal by a direct butt coupling integrated-optic.

28. The monitoring system of claim 13 wherein said directly coupled pump diode is coupled to said lasing crystal by a direct butt coupling integrated-optic and said directly coupled photodetector is coupled to said lasing crystal by a direct butt coupling integrated-optic.

* * * * *